(12) United States Patent
Richards et al.

(10) Patent No.: US 9,021,271 B1
(45) Date of Patent: Apr. 28, 2015

(54) INJECTING CODE DECRYPTED BY A HARDWARE DECRYPTION MODULE INTO JAVA APPLICATIONS

(75) Inventors: Gareth D. Richards, Woodstock (GB); Lawrence N. Friedman, Arlington, MA (US); Alexander Volanis, Chelmsford, MA (US); Yedidya Dotan, Tel Aviv (IL)

(73) Assignee: EMC Corporation, Hopkinton, MA (US)

( * ) Notice: Subject to any disclaimer, the term of this patent is extended or adjusted under 35 U.S.C. 154(b) by 287 days.

(21) Appl. No.: 13/337,817

(22) Filed: Dec. 27, 2011

(51) Int. Cl.
*G06F 11/30* (2006.01)
*G06F 11/34* (2006.01)

(52) U.S. Cl.
CPC ..................... *G06F 11/34* (2013.01)

(58) Field of Classification Search
CPC ................ G06F 9/44589; G06F 9/45504
USPC .......................................... 713/189
See application file for complete search history.

(56) References Cited

U.S. PATENT DOCUMENTS

| | | | |
|---|---|---|---|
| 6,295,643 B1 * | 9/2001 | Brown et al. | 717/148 |
| 6,850,953 B1 * | 2/2005 | Deshpande et al. | 1/1 |
| 8,499,357 B1 * | 7/2013 | Juvekar | 726/27 |
| 2004/0044739 A1 * | 3/2004 | Ziegler | 709/213 |
| 2006/0179058 A1 * | 8/2006 | Bram et al. | 707/9 |
| 2010/0205459 A1 * | 8/2010 | Schwarz | 713/190 |
| 2012/0159439 A1 * | 6/2012 | Kaplinger et al. | 717/121 |
| 2012/0246487 A1 * | 9/2012 | Gu et al. | 713/190 |

OTHER PUBLICATIONS

Roubtsov, Vladimir, "Cracking Java byte-code encryption," JavaWorld.com, 5 pages, dated May 9, 2003, http://www.javaworld.com/javaworld/javaqa/2003-05/01-qa-0509-jcrypt.html.
"Copy protection for a .Net application," Bytes.com, 41 pages, dated Jul. 21, 2005, accessed from http://bytes.com/topic/net/answers/118430-copy-protection-net-application on Nov. 16, 2011 at 9:21pm (see pp. 14-15).
"Hardware security module," From Wikipedia, 4 pages, accessed from http://en.wikipedia.org/wiki/Hardware_security_module on Nov. 15, 2011 at 7:16pm.

* cited by examiner

*Primary Examiner* — Esther B Henderson
(74) *Attorney, Agent, or Firm* — BainwoodHuang

(57) ABSTRACT

A method is performed by a computer in communication with a hardware security module (HSM). The method includes (a) running a process virtual machine (PVM) on the computer, the PVM being configured to execute portable bytecode instructions within a PVM environment and (b) executing, within the PVM environment, instructions for (1) reading encrypted instruction code from data storage of the computer, (2) sending the encrypted instruction code to the HSM, (3) in response, receiving decrypted instruction code from the HSM, and (4) injecting the decrypted instruction code within an application running in the PVM environment for execution by the PVM. Embodiments are also directed to analogous computer program products and apparatuses.

17 Claims, 5 Drawing Sheets

INJECTING CODE DECRYPTED BY A HARDWARE DECRYPTION MODULE INTO JAVA APPLICATIONS

BACKGROUND

With the rise of the World Wide Web, programming languages able to create highly portable code have surged in popularity. In particular, the Java programming language has become one of the dominant programming languages in use today. When Java source code is compiled, it is compiled into a portable bytecode format which is executable by a Java Virtual Machine (JVM), which is a process virtual machine that has been implemented on many different platforms. Thus, Java bytecode for any application can be easily widely distributed and executed on a wide variety of platforms without the need to tailor the bytecode to any particular platform.

SUMMARY

Unfortunately, bytecode is typically much easier to decompile or reverse-engineer than standard platform-dependent machine code. This raises problems for certain kinds of applications, particularly those involving cryptography, which typically require secrecy. Furthermore, simply encrypting a Java class file and then using a custom class loader to decrypt the encrypted class is not effective, because the decryption code is still susceptible to decompilation and also because even custom class loaders call a particular class definition method with the unencrypted class code, which call can be easily intercepted.

In contrast to using a custom class loader to decrypt an encrypted class, the present disclosure is directed to techniques for using a hardware decryption module to decrypt encrypted code and then securely injecting that code into an application. In some embodiments, this is accomplished by sending encrypted code (written in a scripting language) to the hardware module for decryption and running a scripting execution shell that can execute the decrypted script code returned by the hardware module on-the-fly. In other embodiments, it may be accomplished by creating a special class defined by the decrypted script code returned by the hardware module.

In one embodiment, a method is provided. The method is performed by a computer in communication with a hardware security module (HSM). The method includes (a) running a process virtual machine (PVM) on the computer, the PVM being configured to execute portable bytecode instructions within a PVM environment and (b) executing, within the PVM environment, instructions for (1) reading encrypted portable bytecode from data storage of the computer, (2) sending the encrypted portable bytecode to the HSM, (3) in response, receiving decrypted instruction code from the HSM, and (4) injecting the decrypted instruction code within an application running in the PVM environment for execution by the PVM. Embodiments directed to analogous computer program products and apparatuses are also provided.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Techniques are provided herein for using a hardware decryption module to decrypt encrypted code and then securely injecting that code into a Java application. In some embodiments, this is accomplished by sending encrypted code (written in a scripting language) to the hardware module for decryption and running a scripting execution shell that can execute the decrypted script code returned by the hardware module on-the-fly. In other embodiments, it may be accomplished by creating a special class defined by the decrypted script code returned by the hardware module.

Figure 1:
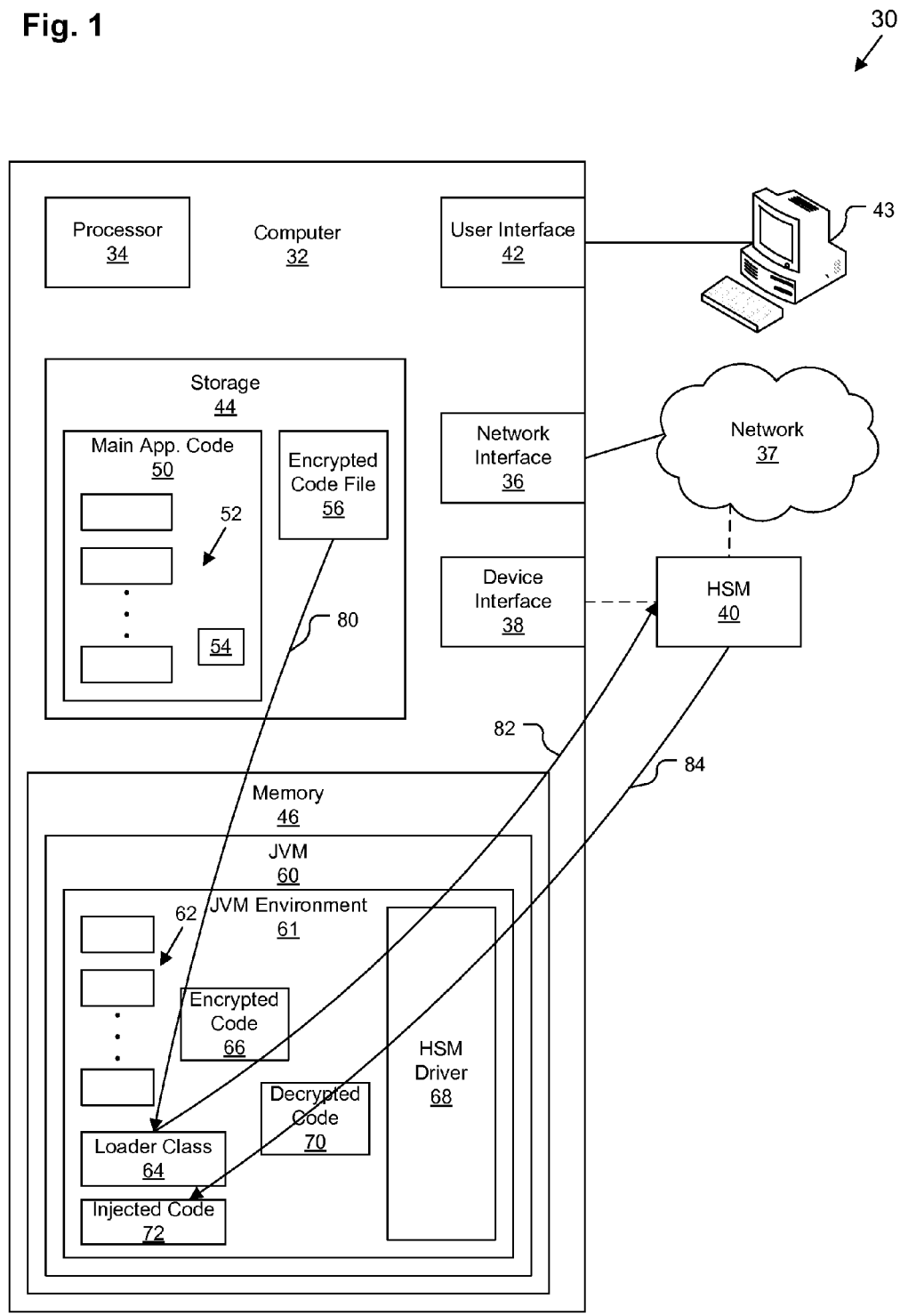
FIG. 1 illustrates an example system for use in connection with various embodiments.

FIG. 1 depicts a system 30 for use in connection with various embodiments. System 30 includes a computer 32. Computer 32 may be any kind of computing device, such as, for example, a personal computer, a desktop computer, a workstation computer, a server computer, an enterprise server computer, a laptop computer, a mobile computer, a portable computing device, a tablet computing device, a smart phone, etc. Computer 32 includes a processor 34. Processor 34 may be, for example, a central processing unit, a microprocessor, a collection of multiple microprocessors, a digital signal processor, a field-programmable gate array, a collection of circuits configured to perform various operations, or another similar device or set of devices configured to perform operations.

In some embodiments, computer 32 also may include a network interface 36 for connecting to network 37. Network 37 may be, for example, a wide area network (WAN), a local area network (LAN), a point-to-point connection, etc. In some embodiments, computer 32 connects to a hardware security module (HSM) 40 via network 37, while, in other embodiments, computer 32 connects to HSM 40 via a device interface 38 of the computer 32. Device interface 38 may be, for example, a Universal Serial Bus (USB) interface, another external serial bus interface, an external parallel bus interface, a plug-in card interface (such as, for example, PCI, PCI Express, etc.), etc.

HSM 40 is a secure cryptoprocessor device. An HSM 40 may be, for example, a plug-in card (e.g., plugging into a PCI or PCI Express slot on a motherboard of the computer 32), a plug-in module (e.g., plugging into a USB port of the computer 32, either directly or via one or more cables and one or more hubs), or a network device communicating with the computer 32 over network 37 using TCP/IP or a similar protocol. The HSM 40 is configured to receive data, cryptographically process (e.g., encrypt or decrypt) it using an algorithm and key stored on the HSM 40, and send the cryptographically processed data back to the computer 32.

Computer 32 may also include a user interface (UI) 42 for connecting to one or more UI devices 43. UI devices 43 may include, for example, a display monitor, a touch-sensitive display device, a keyboard, a keypad, a mouse, a tracking pad, a tracking ball, etc.

Computer 32 also includes storage 44 and memory 46. Storage 44 is a form of non-volatile memory for storing files and data. Storage 44 may be, for example, a hard disk drive, a floppy diskette drive, a CD-ROM drive, a DVD drive, a Blu-ray drive, a solid-state disk drive, magnetic storage, optical storage, flash memory, some combination thereof, or another similar device or set of devices configured to store application programs and or application data. Memory 46 may include, for example, system memory, cache memory, volatile memory, random access memory, some combination thereof, or another similar device or set of devices configured to store running software and or data.

Storage 44 stores main application code 50. Main application code 50 includes a set of class files 52 and a loader class file 54, making up the main application. The main application may be any kind of Java application that contains code which is sensitive to decompilation or reverse engineering, such as code involving the use of cryptography. This might include an application whose core functions (defined within the class files 52) relate to electronic security protection. For example, the main application may be an application whose core functions include functions for authenticating a user using a one time password, such as, for example the RSA Authentication Manager, part of the RSA SecurID family, produced by the EMC Corp. of Hopkinton, Mass. As another example, the main application may be an application whose core functions include functions for providing secure access to an encrypted file.

The class files 52, 54 are in a portable bytecode format, the portable bytecode format being designed to operate on a process virtual machine (PVM), which, as is well-known in the art, is a piece of application software that runs on the computer 32 (on top of a separate host operating system) and that provides a virtual execution environment for the portable bytecode, the portable bytecode containing instructions which are executed by the PVM.

It should be understood that, within this Description, any time a piece of software is described as executing, running, operating, or performing a method, function, step, operation, etc., the method, function, step, or operation is actually performed by the processor 34 while executing code of the software stored in memory 46.

In one embodiment, used hereinafter as the primary example, the PVM is a Java Virtual Machine (JVM), and the class files 52, 54 are written in Java bytecode. Class files 52, 54 may have been compiled from Java source code or from any other kind of code which can be compiled into Java bytecode format, such as, for example, Groovy, Scala, Python, C, etc. The portable bytecode is typically machine-readable code, which is code which does not actually contain alphanumeric characters, but rather binary codes that represent instructions. Machine-readable code is not directly understandable to most humans—rather a human will typically only be able to understand the machine-readable code once it has been converted into an assembly-like format.

In some embodiments (depicted), storage 44 also stores an encrypted code file 56. Encrypted code file 56 is an encrypted form of a file containing code, such as a scripting language like Groovy or JavaScript. In other embodiments (not depicted), encrypted code file 56 may instead be stored on the HSM 40. In some embodiments, encrypted code file 56 may be stored as an application code file, such as a Java ".class" file, while in other embodiments, it may be stored as a Java resource file, or as a resource file within a container file.

Storage 44 may also store additional components (not depicted), such as an operating system, JVM code and libraries, other application programs (both native and JVM-based), application data, user data, etc.

Memory 46 stores a JVM 60 during execution, as well as other executing and loaded code such as the operating system, drivers, and other applications and data (not depicted). JVM 60 includes a JVM environment 61 for the execution of loaded Java bytecode, such as main application classes 62 and loader class 64 (loaded from the set of class files 52 and the loader class file 54, respectively). JVM environment 61 may also store encrypted code 66 from encrypted code file 56, a decrypted version 70 of the code, an injected version 72 of the code, and an HSM driver 68, which is configured to allow JVM code to interface with the HSM 40.

In operation, once the main application has been loaded into memory 46 as main application classes 62 and loader class 64, loader class 64 loads the encrypted code file 56 into memory 46 as encrypted code 66 (indicated by arrow 80) and sends the encrypted code 66 to the HSM 40 via the HSM driver 68 (indicated by arrow 82). Then, the HSM 40 is able to decrypt the encrypted code 66 and send decrypted code 70 back to the loader class 64 via HSM driver 68 to be stored in memory 46, allowing the loader class 64 to inject the decrypted code 70 into the main Java application as injected code 72 (indicated by arrow 84). These operations will be described in further detail below.

Storage 44 may include a computer program product. The computer program product stores a computer program within a tangible non-transitory computer-readable storage medium. The computer program, when executed by processor 34 (and stored in memory 46), is configured to cause the processor 34 to perform a method (see FIGS. 2-5, below) according to various embodiments.

Figure 2:
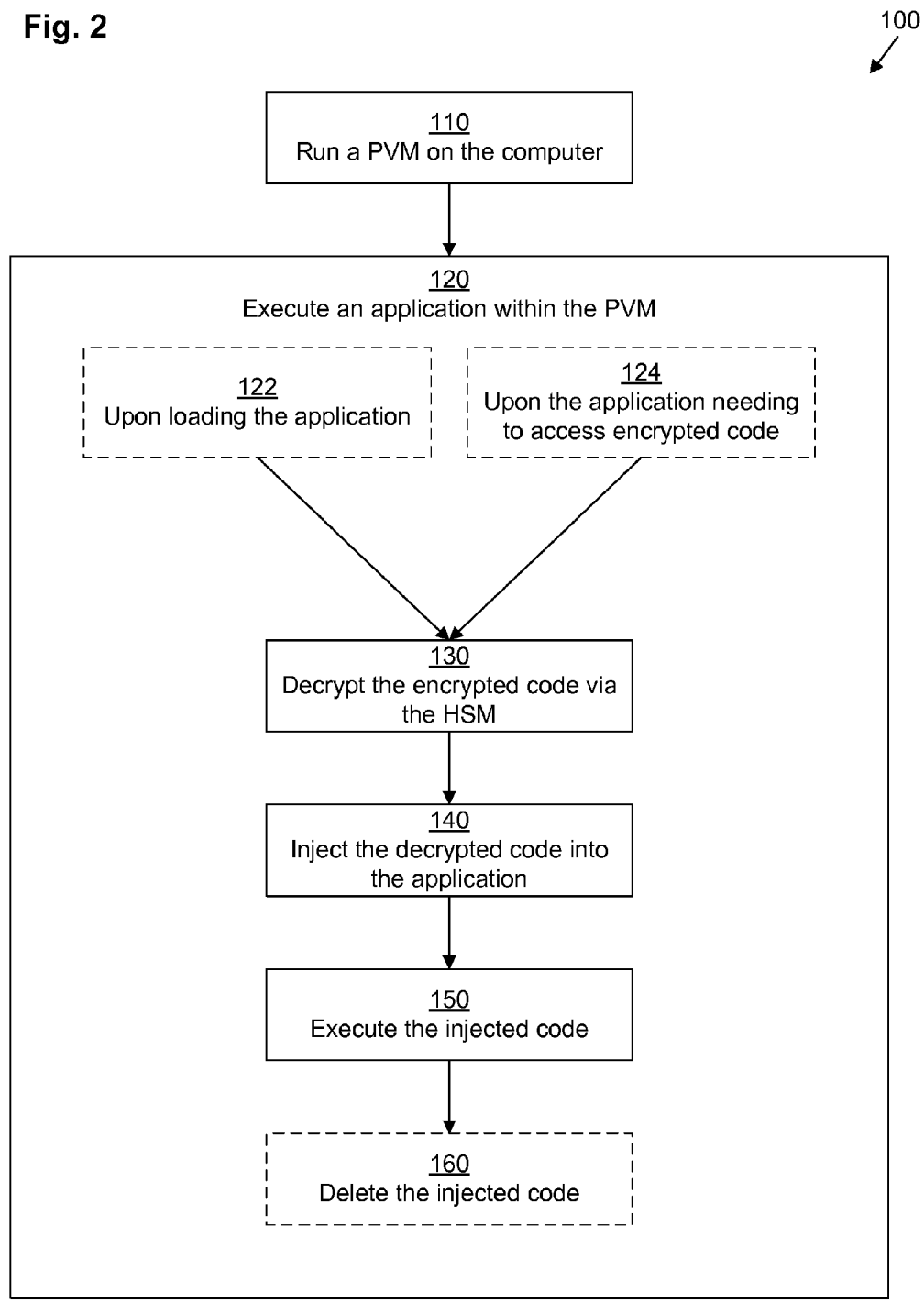
FIG. 2 illustrates an example method according to one embodiment.

FIG. 2 depicts an example method 100 according to various embodiments. Method 100 is performed by computer 32. In step 110, a PVM, such as JVM 60, is loaded into memory 46, allowing the JVM environment 61 to run. In step 120, the main application is run within the PVM environment (e.g., JVM environment 61), typically upon being loaded by a user via the UI 42. When the main application is run, classes 62 may be executed to perform core operations of the main application. At some point during execution, code contained within the encrypted code file 56 may be needed to be executed in conjunction with the main application classes 62. In one embodiment, upon the main application first loading (step 122), loader class 64 may be invoked to load injected code 72 from the encrypted code file 56. In other embodiments, the loader class 64 may only be invoked to perform that function upon code from the main application classes 62 actually having a need to run the injected code 72 within the context of operation (step 124). In any case, once the loader class 64 is invoked, it causes the encrypted code file 56 to be decrypted by the HSM 40 and stores the decrypted code 70 in memory 46 (step 130). Loader class 64 also injects the decrypted code 70 into the main application as injected code 72 (step 140), so that the calling class 62 can call the injected code 72 to be executed by the JVM 60 within the JVM environment 61 (step 150). In some embodiments, once the injected code 72 is executed, it (as well as the decrypted code 70) is deleted from memory 46 to achieve a high degree of security, while, in other embodiments, the injected code 72 remains in memory as long as the main application continues to execute in case it is needed again.

Figure 3:
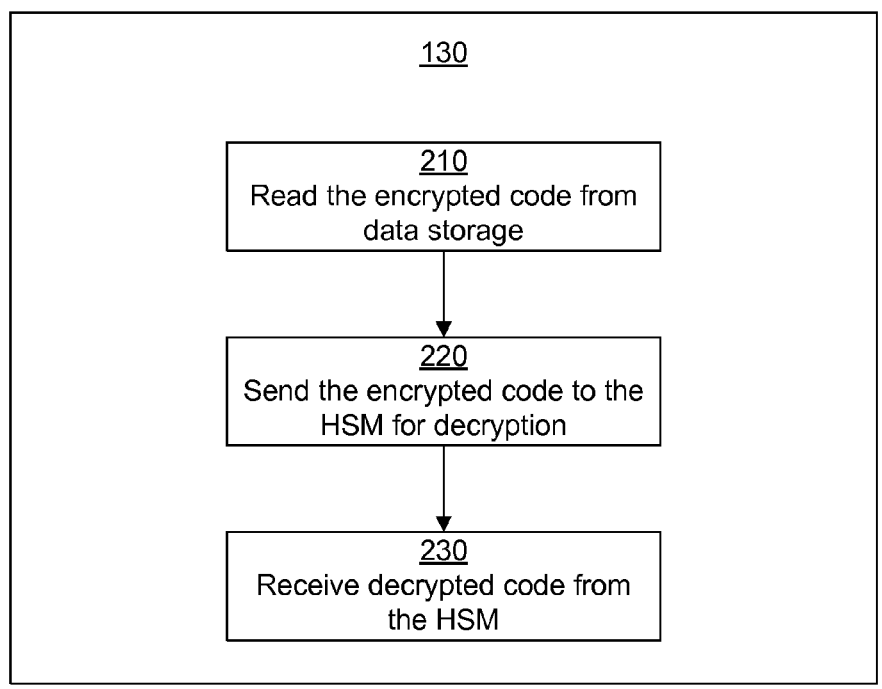
FIG. 3 illustrates additional detail with respect to a step of the example method of claim 3 according to various embodiments.

FIG. 3 depicts step 130 in further detail. In sub-step 210, the loader class 64 reads the encrypted code file 56 from storage 44 and stores it in memory 46 as encrypted code 66. In sub-step 220, loader class 64 sends the encrypted code 66 to the HSM 40, using calls to the HSM driver 68 to accomplish this. In sub-step 230, the loader class 64 receives decrypted code 70 back from the HSM 40 via the HSM driver 68.

Figure 4:
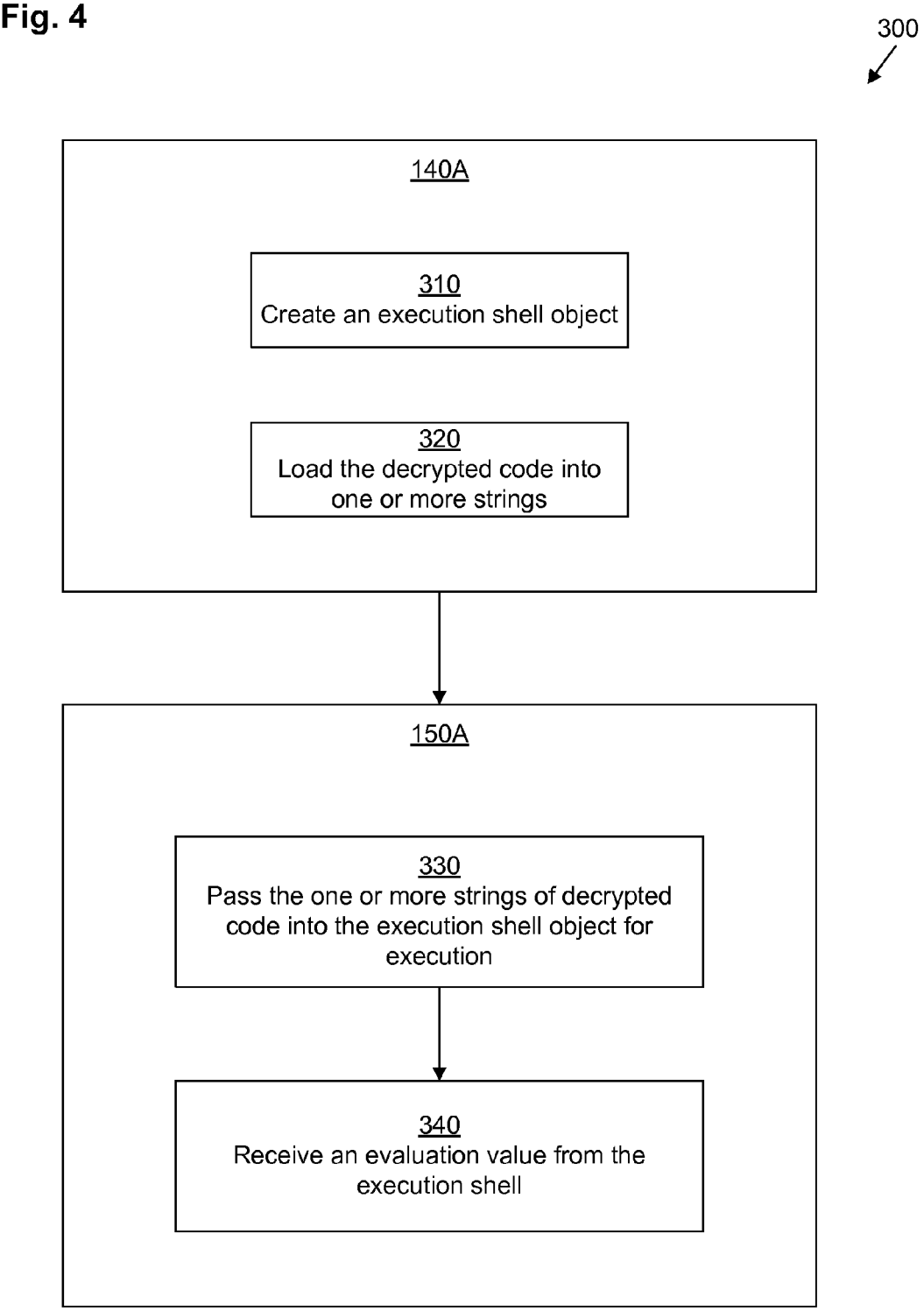
FIG. 4 illustrates additional detail with respect to a various steps of the example method of claim 3 according to various embodiments.
Figure 5:
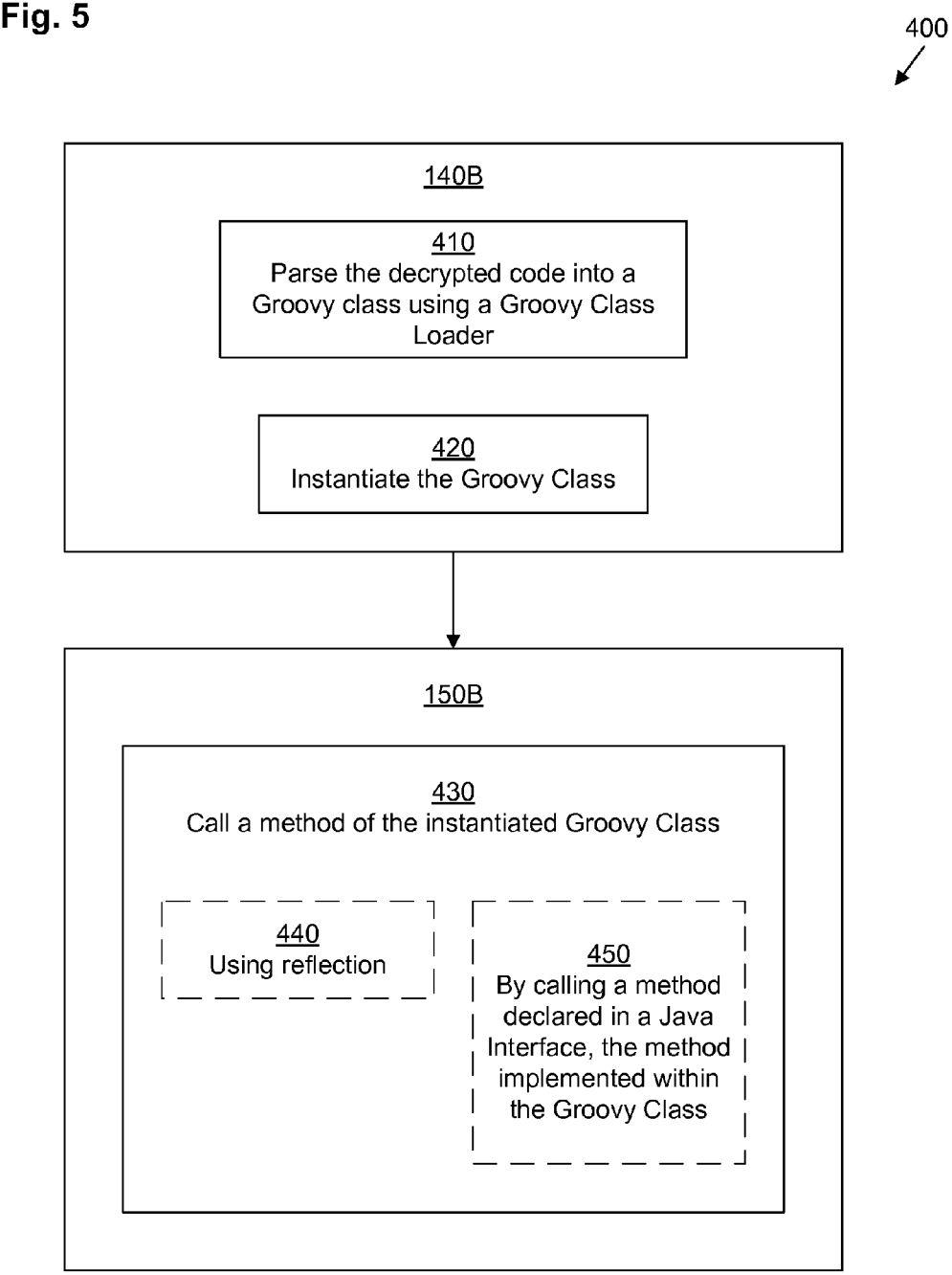
FIG. 5 illustrates additional detail with respect to a various steps of the example method of claim 3 according to various other embodiments.

FIGS. 4 and 5 depict different embodiments for performing steps 140 and 150 from method 100 of FIG. 2. FIG. 4 depicts a first set of embodiments 300, involving steps 140A and 150A, while FIG. 5 depicts a second set of embodiments 400, involving steps 140B and 150B.

In FIG. 4, embodiments 300 involve interpreting the decrypted code 66 as a collection of instructions written in a scripting language such as Groovy or JavaScript. Step 140A includes two sub-steps, 310 and 320, which may be executed in parallel or in any order. In sub-step 310, the loader class 64 creates an execution shell object (e.g., an interpreter) for executing script code. In sub-step 320, the loader class 64 loads the decrypted code 66 into one or more strings, or similar data objects. In one embodiment, the entirety of the decrypted code 66 may be loaded into a single data structure (such as a long string or a long byte array or a similar structure) for all-at-once execution, while in another embodiment, each line of the decrypted code 66 (or possibly it may be broken up into discrete blocks, each block containing several lines of code) may be loaded into a separate data structure (such as a string or a byte array or a similar structure) for piecemeal execution, possibly using a compound data structure, such as an array of strings or a 2-dimensional byte array.

Step 150A includes two sub-steps, 330 and 340. In sub-step 330, the main application passes the loaded string(s) of the decrypted code 66 into the execution shell object for execution. Typically, this execution is performed in an interpretive manner, interpreting each line of scripting code line-by-line and executing each line as interpreted. In the single string embodiment, the entirety of the decrypted code 66 is passed to the execution shell object at once, while in the multiple string example, the main application passes each string of script code into the execution shell object serially. Upon the execution shell object executing the scripted code, the main application is able to receive a returned evaluation value from the execution shell object, or, in some embodiments, the main application code may instead directly inspect variables stored within the execution shell object.

Operation of embodiment 300 may be illustrated by the following snippets of code, which may be found within loader class 64 as well as the main application classes 62. In this implementation, the entire script of the decrypted code 66 is sent all at once by the execution shell object, which is a Groovy execution shell.

```
// The next 3 lines of code from loader class 64 implement sub-step 210
FileInputStream EncCodeFile=new FileInputStream("EncryptedCodeFile.groovy");
int len=EncCodeFile.read(new byte[ ] EncCode);
/* The next line of code from loader class 64 implements sub-steps 220,
* 230, and 320 all in one line of code, although these operations are
* not actually simultaneous */
byte[ ] DecCode=HSMinterface.decrypt(EncCode);
// The next 2 lines of code from loader class 64 implement sub-step 310
Binding binding=new Binding( )
GroovyShell shell=new GroovyShell(binding);
// The next line of code from a main application class 62 implements
// step 150A
Object retVal=shell.evaluate(DecCode);
```

In FIG. 5, embodiments 400 involve converting the decrypted code 66 into a Java class based on a class definition written in a scripting language such as Groovy or JavaScript. Step 140B includes two sub-steps, 410 and 420, which may be executed in parallel or in any order. In sub-step 410, the loader class 64 uses a specialized class loader, such as the Groovy Class Loader class to load and parse the decrypted code 70 into a Java class definition. This Java class definition (making use of Groovy scripted code) is the injected code 72. It should be noted that since the Java class definition uses code written in a scripting language, it is not susceptible to interception.

In sub-step 420, the class loader 64 or a class 62 of the main application may instantiate the injected class 72 as an injected object. In step 150B, a main application class 62 can then call a method of the instantiated class object. In one embodiment, this method can be called by reflection, in which the main application class 62 requests a reference to a method within the object having a certain name (sub-step 440). In another embodiment, the method can be called directly by name (sub-step 450) if the injected class 72 implements a Java Interface that declares a method by that name (in which case, the Groovy code would actually implement a Java Interface). Sub-step 450 is more efficient than sub-step 440, especially if multiple methods are called multiple times, since reflection is relatively slow.

In embodiments in which the main application is an application whose core functions include functions for authenticating a user using a one time password, such as RSA Authentication Manager, the injected Groovy code 72 includes a method for calculating a one time password. Since SecurID one time passwords are calculated in a secret manner, embodiments of the present disclosure serve to obfuscate the techniques used for the calculation, even though the code may be distributed to users who may wish to learn the calculation techniques.

In embodiments in which the main application is an application whose core functions include functions for providing secure access to an encrypted file, the injected Groovy code 72 includes a method for establishing whether the computer 32 includes a plurality of stable system values associated with permission to access the encrypted file. Since the identification of specific stable system values used to unlock a secure file may be secret, embodiments of the present disclosure serve to obfuscate the identification of these stable system values, even though the code may be distributed to users who may wish to learn their identity.

While various embodiments of the invention have been particularly shown and described, it will be understood by those skilled in the art that various changes in form and details may be made therein without departing from the spirit and scope of the invention as defined by the appended claims.

For example, although embodiments have been described in which the PVM is the JVM and the portable bytecode is Java bytecode, it should be understood, that this is by way of example only. In other embodiments, other PVMs that execute other forms of bytecode may be used instead, for example the Common Language Runtime executing Common Intermediate Language code, the Parrot Virtual Machine executing Parrot bytecode, or the Dalvik Virtual Machine executing Dalvik bytecode.

It should be understood that although various embodiments have been described as being methods, computer programs embodying these methods may also be included. Thus, one embodiment includes a tangible computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Furthermore, it should be understood that all embodiments which have been described may be combined in all possible combinations with each other, except to the extent that such combinations have been explicitly excluded or are impossible.

Finally, nothing in this Specification shall be construed as an admission of any sort. Even if a technique, method, apparatus, or other concept is specifically labeled as "prior art" or as "conventional," Applicants make no admission that such technique, method, apparatus, or other concept is actually prior art under 35 U.S.C. §102, such determination being a legal determination that depends upon many factors, not all of which are known to Applicants at this time.

What is claimed is:

1. A method performed by a computer in communication with a hardware security module (HSM), the method comprising:
    running a process virtual machine (PVM) on the computer, the PVM being configured to execute portable bytecode instructions within a PVM environment; and
    executing, within the PVM environment, instructions for:
        reading encrypted instruction code from data storage of the computer;
        sending the encrypted instruction code to the HSM;
        in response, receiving decrypted instruction code from the HSM; and
        injecting the decrypted instruction code within an application running in the PVM environment for execution by the PVM;
    wherein:
        the instructions for reading, sending, receiving, and injecting are Java bytecode instructions included within a loader class module of the application, the application also including additional class modules having instructions to perform core functions of the application;
        the decrypted instruction code is script code written in an interpretable scripting language;
        injecting includes:
            parsing the decrypted instruction code as script code using a script class loader to generate a script-based class; and
            instantiating the generated script-based class as an object; and
        execution of the decrypted instruction code includes calling a method of the instantiated object.

2. The method of claim 1 wherein the portable bytecode instructions executable by the PVM are machine-readable code instructions, which, when executed in the PVM environment, cause the computer to perform associated operations, the portable bytecode instructions also being executable by other PVMs on a plurality of different hardware platforms.

3. The method of claim 2 wherein the PVM is a Java virtual machine (JVM) and the portable bytecode instructions are Java bytecode instructions, executable on any machine running a JVM.

4. The method of claim 1 wherein the instructions within the loader class module are executed by the PVM upon the application being initially loaded into the PVM environment.

5. The method of claim 1 wherein the application further includes instructions for:
    executing the decrypted instruction code;
    upon finishing executing the decrypted instruction code, deleting the decrypted instruction code from memory.

6. The method of claim 1 wherein the core functions of the application relate to electronic security protection.

7. The method of claim 6 wherein:
    the core functions of the application include functions for authenticating a user using a one time password; and
    the decrypted instruction code includes instructions for calculating the one time password.

8. A method performed by a computer in communication with a hardware security module (HSM), the method comprising:
    running a process virtual machine (PVM) on the computer, the PVM being configured to execute portable bytecode instructions within a PVM environment; and
    executing, within the PVM environment, instructions for:
        reading encrypted instruction code from data storage of the computer;
        sending the encrypted instruction code to the HSM;
        in response, receiving decrypted instruction code from the HSM; and
        injecting the decrypted instruction code within an application running in the PVM environment for execution by the PVM;
    wherein:
        the instructions for reading, sending, receiving, and injecting are Java bytecode instructions included within a loader class module of the application, the application also including additional class modules having instructions to perform core functions of the application;
        the core functions of the application relate to electronic security protection;
        the core functions of the application include functions for providing secure access to an encrypted file; and
        the decrypted instruction code includes instructions for establishing whether the computer includes a plurality of stable system values associated with permission to access the encrypted file.

9. A computer program product comprising a non-transitory computer readable storage medium storing portable bytecode instructions, which, when executed by a process virtual machine (PVM) within a PVM environment running on the computer, cause the computer to perform the following operations:
    reading encrypted instruction code from data storage of the computer;
    sending the encrypted instruction code to a hardware security module (HSM) in communication with the computer;
    in response, receiving decrypted instruction code from the HSM; and
    injecting the decrypted instruction code within an application running in the PVM environment for execution by the PVM;
wherein:
    the instructions for reading, sending, receiving, and injecting are Java bytecode instructions included within a loader class module of the application, the application also including additional class modules having instructions to perform core functions of the application;

the decrypted instruction code is script code written in an interpretable scripting language;
injecting includes:
parsing the decrypted instruction code as script code using a script class loader to generate a script-based class; and
instantiating the generated script-based class as an object; and
execution of the decrypted instruction code includes calling a method of the instantiated object.

10. The computer program product of claim 9 wherein the instructions within the loader class module are executed by the PVM upon the application being initially loaded into the PVM environment.

11. The computer program product of claim 9 wherein the computer program product further includes instructions, which, when executed by the PVM within the PVM environment running on the computer, cause the computer to perform the following operations:
executing the decrypted instruction code;
upon finishing executing the decrypted instruction code, deleting the decrypted instruction code from memory.

12. The computer program product of claim 9 wherein calling the method of the instantiated object includes calling by reflection.

13. The computer program product of claim 9 wherein calling the method of the instantiated object includes directly calling, the method of the instantiated object, the generated script-based class implementing an abstract interface declared within Java bytecode of the application, the abstract interface declaration also declaring the method as an abstract method of the abstract interface.

14. A method performed by a computer system having a hardware security module (HSM), the method comprising:
running a process virtual machine (PVM) on the computer, the PVM being configured to execute portable bytecode instructions within a PVM environment; and
executing, within the PVM environment, instructions for:
causing the HSM to:
read encrypted instruction code persistently stored within the HSM;
decrypt the encrypted instruction code to yield decrypted instruction code; and
send the decrypted instruction code to the PVM; and
injecting the decrypted instruction code within an application running in the PVM environment for execution by the PVM;
wherein:
the instructions for injecting and for causing the HSM to read, decrypt, and send are Java bytecode instructions included within a loader class module of the application, the application also including additional class modules having instructions to perform core functions of the application;
the decrypted instruction code is script code written in an interpretable scripting language;
injecting includes:
parsing the decrypted instruction code as script code using a script class loader to generate a script-based class; and
instantiating the generated script-based class as an object; and
execution of the decrypted instruction code includes calling a method of the instantiated object.

15. The method of claim 5 wherein the instructions within the loader class module are executed by the PVM in response to execution of portable bytecode instructions of the application having a need to access the decrypted instruction code.

16. The method of claim 1 wherein calling the method of the instantiated object includes calling by reflection.

17. The method of claim 1 wherein calling the method of the instantiated object includes directly calling the method of the instantiated object, the generated script-based class implementing an abstract interface declared within Java bytecode of the application, the abstract interface declaration also declaring the method as an abstract method of the abstract interface.

* * * * *